United States Patent
Luo et al.

(10) Patent No.: US 7,892,397 B2
(45) Date of Patent: Feb. 22, 2011

(54) METHOD OF DEGUMMING CELLULOSIC FIBRES

(75) Inventors: Keith Luo, Edmonton (CA); Wade Chute, Edmonton (CA)

(73) Assignee: Alberta Innovates - Technology Futures, Edmonton, Alberta (CA)

( * ) Notice: Subject to any disclaimer, the term of this patent is extended or adjusted under 35 U.S.C. 154(b) by 350 days.

(21) Appl. No.: 12/126,331

(22) Filed: May 23, 2008

(65) Prior Publication Data

US 2008/0289783 A1 Nov. 27, 2008

Related U.S. Application Data

(60) Provisional application No. 60/939,662, filed on May 23, 2007.

(51) Int. Cl.
- *D21C 11/00* (2006.01)
- *D21C 3/00* (2006.01)
- *D01C 1/02* (2006.01)

(52) U.S. Cl. ............................. 162/29; 162/17; 162/20; 162/25; 162/78; 162/81; 162/90; 162/91; 162/94; 162/96; 162/98

(58) Field of Classification Search ................... 162/17, 162/25, 29, 41, 78, 81, 90, 91, 94, 95, 97, 162/98
See application file for complete search history.

(56) References Cited

U.S. PATENT DOCUMENTS

| | | | | |
|---|---|---|---|---|
| 2,394,989 | A | * | 2/1946 | Dreyfus ...................... 162/76 |
| 4,106,979 | A | | 8/1978 | Ruffini et al. |
| 4,548,675 | A | | 10/1985 | Gordy |
| 5,145,558 | A | | 9/1992 | Christiansen et al. |
| 6,302,997 | B1 | | 10/2001 | Hurter et al. |

FOREIGN PATENT DOCUMENTS

| | | |
|---|---|---|
| JP | 2004011031 | 1/2004 |
| RU | 2233926 | 8/2004 |
| WO | 9749858 | 12/1997 |
| WO | 0237981 | 5/2002 |
| WO | 2004061224 | 7/2004 |
| WO | 2007123974 | 11/2007 |

OTHER PUBLICATIONS

Efanov, M.V. et al., Peroxide-Amonia Delignification of Pine Wood, Chemistry of Natural Compounds, 2004, pp. 172-175, vol. 40, No. 2, Plenem Publishing Corporation, Russia.

Kim, Jun Seok, et al., Pretreatment of Wastepaper and Pulp Mill Sludge by Aqueous Ammonia and Hydrogen Peroxide, Applied Biochemistry and Biotechnology, 2000, pp. 129-139, vol. 84-86, Humana Press Inc.

\* cited by examiner

*Primary Examiner*—Eric Hug
*Assistant Examiner*—Peter Chin
(74) *Attorney, Agent, or Firm*—Bennett Jones LLP

(57) ABSTRACT

A process for producing dissolving pulp includes a degumming step using a degumming liquor which includes hydrogen peroxide and ammonia.

16 Claims, 1 Drawing Sheet

METHOD OF DEGUMMING CELLULOSIC FIBRES

CROSS REFERENCE TO RELATED APPLICATIONS

This application claims the priority benefit of U.S. Provisional Patent Application No. 60/939,662, entitled Method of Degumming Cellulosic Fibres, filed on May 23, 2007, the contents of which are incorporate herein by reference.

FIELD OF THE INVENTION

The present invention relates to a method of degumming or delignifying lignocellulosic fibres, and in particular to a method of producing dissolving pulp fibres.

BACKGROUND

Pulp is a generic term for a wide range of technically distinct products resulting from complex manufacturing processes that involve the chemical and/or mechanical treatment of various types of plant material. Wood currently provides the basis for approximately 90% of global pulp production; the remaining 10% begins as straw, bamboo, bagasse, kenaf, flax, hemp, cotton, and the like. Pulp is used predominantly as a major component in the manufacture of paper and paperboard. Smaller quantities of pulp find their way into a diversity of products—rayon, photographic films, cellophane and explosives.

The highest grade of pulp is chemical-grade or dissolving-grade pulp. Dissolving pulp is used in the manufacture of value-added products such as:

viscose fiber (rayon) or film, made by dissolving pulp in alkaline carbon disulfide (xanthation) thus forming the xanthate salt as an intermediate product, and forcing the solution through orifices into an acid bath.

cellulose derivatives such as cellulose acetate, ethyl cellulose, cellulose nitrate (nitrocellulose, guncotton), and carboxymethylcellulose (CMC).

Dissolving pulp manufacture usually utilizes kraft or sulfite pulping of wood (both softwoods and hardwoods), or soda pulping of cotton linters. When pulping wood for dissolving pulp, the bleached yield is only 32-36% so as to obtain purer pulp. The cellulose content is commonly 88-93% (for commodity grade viscose), but may be as high as 98% for more demanding end-uses (eg: tire cord). The contents of extractives, lignin, iron and ash are also low. Viscosity (ie: DP) is another important property, with the actual level depending on the end-use of the pulp. For commodity grade viscose, the viscosity may be about 350 to about 550 ml/g. High grade dissolving pulp may exceed 600 ml/g.

To create dissolving pulp, conventional kraft pulping is modified to include a prehydrolysis stage, before the main cook, where the hemicellulose is hydrolyzed and removed. Dilute acid or alkali, or just direct steam, is used in this prehydrolysis stage. This additional stage approximately doubles total cooking time, relative to a normal kraft cook. A cold alkali extraction stage in the bleaching sequence further removes the non-cellulose components.

Acid sulfite pulping is carried out at a high temperature and low pH to achieve the desired hemicellulose degradation. Bleaching includes a hot alkali extraction stage to further remove the non-cellulose components.

Some studies have indicated that dissolving pulp may be obtainable from either bleached hardwood kraft market pulp or high quality wood pulp rich in hardwood fiber. The sequence included two cold alkali extraction stages with xylanase treatment in between. [Jackson, L. S. et al. Production of dissolving pulp from recovered paper using enzymes. TAPPI Journal, March 1998].

These prior art methods of producing dissolving pulp consume large amounts of chemicals and energy, and require complex black liquor recycling processes. A separate bleaching step is required after alkaline degumming.

Therefore, there is a need in the art for methods of producing degummed pulp suitable for producing dissolving pulp which mitigates the disadvantages of the prior art.

SUMMARY OF THE INVENTION

In one aspect, the invention comprises a method of degumming cellulosic fibres comprising the step of treating the fibres with a degumming liquor comprising between about 5% to about 30% (v:v) aqueous ammonia and between about 0.5% to 3% (on OD fibre) hydrogen peroxide, at a temperature between about 50° to about 200° C., at a consistency of about 3:1 to about 20:1 liquor to solids (v/w). The degumming liquor may further comprise 0% to 10% (on OD fibre) of potassium hydroxide and 0% to 0.2% (on OD fibre) of anthraquinone.

In one embodiment, the cellulosic fibres may comprise hardwoods, softwoods, and bast fibre plants, for example, hemp, flax, kenaf, linseed, jute, ramie and other dicotyledonous plants having fibrous phloem, such as cereals, perennial grasses, or legumes.

In one embodiment, the degumming liquor is recovered following degumming, and an aqueous portion is recycled to provide ammonia, and a solid portion is recovered in a waste recovery stream. In one embodiment, the solid portion is recovered and treated to form a fertilizer.

The degummed fibres may be bleached to form dissolving pulp.

In another aspect, the invention comprises a method of forming dissolving pulp from bast fibre plants, comprising the steps of:

(a) pulping the plant fibre with a degumming liquor comprising ammonia and hydrogen peroxide;

(b) recovering and recycling an aqueous portion from step (a);

(c) recovering the pulped fibres and bleaching to produce dissolving pulp.

The bast fibre plant fibres may comprise hemp, flax, kenaf, linseed, jute, or ramie fibres.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

Figure 1:
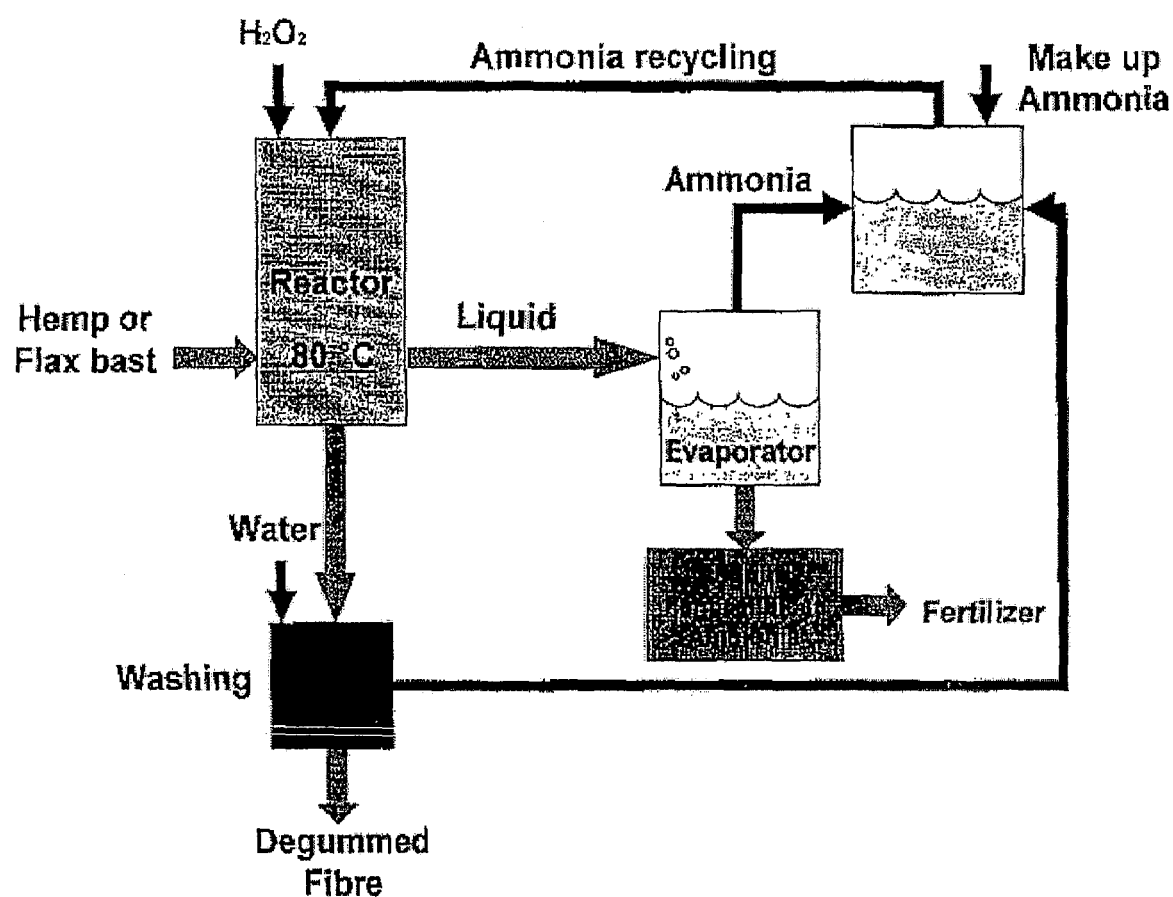
FIG. 1 is a schematic view of one embodiment of the present invention.

The present invention relates to methods of degumming cellulosic fibres, and in particular to a method of producing high quality dissolving pulp. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

In general, the present invention comprises a method of degumming cellulosic fibres using ammonia. The degummed fibres may then be bleached using processes well known in the art, such as chlorine bleaching, elemental chlorine-free ("ECF") bleaching or total chlorine-free ("TCF") bleaching. Given the environmental benefits of ECF and TCF bleaching, preferred embodiments use those technologies.

In one embodiment, the degumming method is used for cellulosic fibres such as hardwoods, softwoods, and bast fibre plants, for example, hemp, flax, kenaf, linseed, jute, ramie and other dicotyledonous plants having fibrous phloem, such as cereals, perennial grasses, or legumes. In one embodiment, the cellulosic fibres comprise hemp or flax fibres.

Methods of separating bast fibre from plant stalks are well known in the art, and need not be further described herein. One exemplary method of decorticating bast fibre plants is described in Applicant's co-pending U.S. patent application, filed on May 23, 2008 and entitled "Decortication Process".

In the present invention, the inventors have surprisingly found that milder conditions than that found in the prior art, may still result in high quality dissolving-grade pulp.

In one embodiment, the separated bast fibres are mixed in a reactor (10) with ammonia at an elevated temperature. In one embodiment, ammonium hydroxide is used in a concentration of about 5% to 30% by volume, and at a temperature which is between about 50° C. to about 200° C. Preferably, the temperature is a temperature between about 90° to about 150°, for example, 90° C., 100° C., 120° C., or 150° C. In one embodiment, an amount of a chlorine-free bleaching agent, such as hydrogen peroxide, is used to simultaneously bleach the fibres. This ammonia-peroxide degumming process may take place for about 1 hour to 6 hours at a consistency of about 3:1 to about 20:1 liquor-to-solids ratio (v:w). Those skilled in the art may determine suitable conditions by varying these parameters without undue experimentation. As is well known, increase in severity of one parameter may allow for reduction in the others. For example, the use of higher temperatures or higher concentrations of ammonia may allow reduced cook time. Alternatively, lower concentrations of ammonia may require higher temperatures or cook time to achieve similar results.

The amount of hydrogen peroxide is less than 3%, preferably less than about 2%, and most preferably less than about 1% (by weight of oven dry (OD) fibre).

In one embodiment, an alkali such as potassium hydroxide (KOH), potassium carbonate, or magnesium hydroxide may be added to the degumming liquor in a concentration of 0% to about 10% (on OD fibre). The degumming liquor may further comprise 0% to 0.2% (on OD fibre) of anthraquinone. Both the alkali and anthraquinone aids in delignification of the cellulosic fibres, and may therefore be preferable for processing more lignified material, such as wood fibres and cereal straw.

After pulping and degumming in the reactor, in one embodiment, the liquids are recovered and sent to an evaporator (20) where the ammonia is recovered to an ammonia recycling tank (30) which is used as the source of ammonia for the reactor (10). A make-up source (40) of ammonia is provided. The solids remaining from the evaporator (20) comprise lignin and hemicellulose, with trace ammonia, and are removed to solids recovery tank (50) and may be processed into fertilizer in a waste recovery stream (60).

The pulped and degummed fibres are then washed with water in washing tank (70), in one embodiment resulting in a neutral pH, and the resulting fibres are then sent for bleaching (80). The wash water will contain ammonia and peroxide and may then be recycled to the ammonia recycling tank (30).

In one embodiment, in a method of producing dissolving pulp, the degummed fibres are then bleached in a TCF or an ECF bleaching process. For example, the fibres may be bleached in a three or four stage ECF process followed by a cold alkaline extraction. Exemplary conditions of one embodiment are shown below in Table 1:

TABLE 1

| Bleaching stage | Pulp cons. % | Temp. ° C. | Retention time min | Target pH | $ClO_2$ % on OD fibre | NaOH % on OD fibre | $H_2O_2$ % on OD fibre |
|---|---|---|---|---|---|---|---|
| $D_0$ | 10 to 15 | 70-80 | 40-90 | 2.5 | 1-7 | | |
| $E_p$ | 10 to 15 | 70-80 | 60-120 | 11 | | 0.5-1 | 0.5-1 |
| $D_1$ | 10 to 15 | 70-80 | 90-150 | 4 | 0.5-2 | | |
| $D_2$ | 10 to 15 | 70-80 | 90-150 | 4 | 0.5-2 | | |
| E* | 3 to 15 | 0-40 | 30-90 | | | | |

*NaOH concentration at the cold alkaline extraction stage was 10% w/w.
"D" refers to use of chlorine dioxide
"$E_p$" refers to an alkaline extraction with hydrogen peroxide.
"E" refers to an alkaline extraction In one embodiment, an ECF process is preferred as it is believed the chlorine dioxide dissolves non-bast fibres in the bast fibre feedstock.

The resulting dissolving pulp is of high quality. Dissolving pulp from a bast fibre plant such as hemp may produce yield of greater than 55%, with brightness greater than about 92% ISO, with alpha cellulose content in excess of 98% and viscosity of more than 650 ml/g is achievable with the methods of the present invention.

EXAMPLES

In the examples provided below, "AP pulping" refers to ammonia peroxide pulping, the abbreviation "L:S" refers to the liquid to solids ratio, the abbreviation "AQ" refers to the anthraquinone content and the abbreviation "OD" refers oven-dry.

Example 1

AP pulping of hemp bast fibre at 150° C. cooking temperature

TABLE 1-1

| AP pulping conditions | | | | | | | |
|---|---|---|---|---|---|---|---|
| $NH_4OH$ Concentration in cooking solution % w/w | Cooking temperature ° C. | Time to cooking temperature min | Time at cooking temperature min | L:S v/w | $H_2O_2$ % on OD fibre | KOH % on OD fibre | AQ % on OD fibre |
| 20 | 150 | 40 | 60 | 10:1 | 1 | 5 | 0.2 |

TABLE 1-2

ECF bleaching conditions

| Bleaching stage | Pulp cons. % | Temp. °C. | Retention time min | Target pH | $ClO_2$ % on OD fibre | NaOH % on OD fibre | $H_2O_2$ % on OD fibre |
|---|---|---|---|---|---|---|---|
| $D_0$ | 10 | 70 | 60 | 2.5 | 5 | | |
| $E_p$ | 10 | 80 | 90 | 11 | | 0.8 | 0.5 |
| $D_1$ | 10 | 80 | 120 | 4 | 1 | | |
| $D_2$ | 10 | 80 | 120 | 4 | 1 | | |
| E* | 3 | 25 | 60 | | | | |

*NaOH concentration at the cold alkaline extraction stage was 10% w/w.

TABLE 1-3

Properties of the hemp bast fibre dissolving pulp

| Brightness % ISO | Viscosity ml/g | Acetone extractives % | R18 % | R10 % | Alpha-cellulose % | Ash % | Pulp yield % |
|---|---|---|---|---|---|---|---|
| 92.08 | 658.51 | 0.06 | 99.11 | 98.25 | 98.67 | 0.05 | 55.52 |

Example 2

AP Pulping of Hemp Bast Fibre at 90° C. Cooking Temperature

TABLE 2-1

AP pulping conditions

| $NH_4OH$ Concentration in cooking solution % w/w | Cooking temperature °C. | Time to cooking temperature min | Time at cooking temperature min | L:S v/w | $H_2O_2$ % on OD fibre | KOH % on OD fibre | AQ % on OD fibre |
|---|---|---|---|---|---|---|---|
| 20 | 90 | 40 | 120 | 10:1 | 1 | 5 | 0.2 |

TABLE 2-2

ECF bleaching conditions

| Bleaching stage | Pulp cons. % | Temp. °C. | Retention time min | Target pH | $ClO_2$ % on OD fibre | NaOH % on OD fibre | $H_2O_2$ % on OD fibre |
|---|---|---|---|---|---|---|---|
| $D_0$ | 10 | 70 | 60 | 2.5 | 5 | | |
| $E_p$ | 10 | 80 | 90 | 11 | | 0.8 | 0.5 |
| $D_1$ | 10 | 80 | 120 | 4 | 2 | | |
| E* | 3 | 25 | 60 | | | | |

*NaOH concentration at the cold alkaline extraction stage was 10% w/w.

TABLE 2-3

Properties of the hemp bast fibre dissolving pulp

| Brightness % ISO | Viscosity ml/g | Acetone extractives % | R18 % | R10 % | Alpha-cellulose % | Ash % | Pulp yield % |
|---|---|---|---|---|---|---|---|
| 92.80 | 785.94 | 0.02 | 98.56 | 98.10 | 98.54 | 0.06 | 56.55 |

Several publications or patents are referenced in this application in order to more fully describe the state of the art to which this invention pertains. Where permitted, the disclosure of each of these publications is incorporated by reference in the present specification as though set forth herein in full.

The word "comprising" is used herein in a non-limiting sense, and shall mean "including, without limitation or exclusion of other alternatives".

What is claimed is:

1. A method of degumming cellulosic fibres comprising the step of treating the fibres with a degumming liquor comprising between about 5% to about 30% (v:v) aqueous ammonia and between about 0.5% to 3% (on OD fibre) hydrogen peroxide, at a temperature between about 50° to about 200° C., at a consistency of about 3:1 to about 20:1 liquor to solids (v/w).

2. The method of claim 1 wherein the degumming liquor further comprises potassium hydroxide.

3. The method of claim 1 or 2 wherein the degumming liquor further comprises anthraquinone.

4. The method of claim 1 wherein the degumming liquor is recovered following degumming, and is treated to separate it into an ammonia stream for reuse in the process and a solid fraction.

5. The method of claim 4 wherein the solid portion is recovered and treated to form a fertilizer.

6. The method of claim 1 further comprising the step of bleaching the degummed fibres to form dissolving pulp.

7. The method of claim 1 wherein the cellulosic fibres comprise bast fibre plant fibres.

8. The method of claim 7 wherein the bast fibre plant is one of hemp, flax, kenaf, linseed, jute, or ramie.

9. The method of claim 8 wherein the bast fibre plant is hemp.

10. The method of claim 8 wherein the bast fibre plant is flax.

11. The method of claim 8 wherein the bast fibre plant is kenaf.

12. The method of claim 1 wherein the cellulosic fibres comprise wood fibre, cereal straw fibre, perennial grass fibre, or legume fibre.

13. The method of claim 6 wherein the bleaching step comprises an elemental chlorine-free or total chlorine-free bleaching step.

14. A method of forming dissolving pulp from bast fibre plants, comprising the steps of:
 (a) pulping the plant fibre with a degumming liquor comprising about 5% to about 30% (v:v) aqueous ammonia and between about 0.5% to 3% (on OD fibre) hydrogen peroxide;
 (b) recovering and recycling an aqueous portion from step (a);
 (c) recovering the pulped fibres and bleaching to produce dissolving pulp.

15. The method of claim 14 wherein the degumming step takes place at a temperature between about 50° to about 200° C., at a consistency of about 3:1 to about 20:1 liquor to solids (v/w).

16. The method of claim 13 wherein the final bleaching step comprises an elemental chlorine-free or total chlorine-free bleaching process.

* * * * *